US 6,343,945 B1

(12) United States Patent
Liikanen

(10) Patent No.: US 6,343,945 B1
(45) Date of Patent: Feb. 5, 2002

(54) CARDHOLDER COVER AND EJECTOR

(75) Inventor: Petteri Liikanen, Sydney (AU)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/344,876

(22) Filed: Jun. 25, 1999

(30) Foreign Application Priority Data

Jun. 26, 1998 (GB) ............................................ 9813908

(51) Int. Cl.$^7$ ............................................. H01R 13/62
(52) U.S. Cl. ..................... 439/160; 235/475; 361/814
(58) Field of Search ............................... 439/260, 160, 439/327, 152, 153, 155; 235/479; 361/814

(56) References Cited

U.S. PATENT DOCUMENTS

| | | | |
|---|---|---|---|
| 4,752,234 A | 6/1988 | Reichardt et al. | 439/260 |
| 4,868,846 A | 9/1989 | Kemppi | 379/144 |
| 5,065,004 A | * 11/1991 | Mizuno et al. | 235/479 |
| 5,266,782 A | 11/1993 | Alanara et al. | 235/380 |
| 5,315,638 A | 5/1994 | Mukari | 379/58 |
| 5,353,328 A | 10/1994 | Jokimies | 379/58 |
| 5,448,622 A | 9/1995 | Huttunen | 379/58 |
| 5,487,084 A | 1/1996 | Lindholm | 375/215 |
| 5,488,572 A | * 1/1996 | Belmont | 710/62 |
| 5,600,708 A | 2/1997 | Meche et al. | 379/59 |
| 5,648,651 A | * 7/1997 | Inoue | 235/475 |
| 5,669,069 A | 9/1997 | Rautila | 455/558 |
| 5,809,413 A | 9/1998 | Meche et al. | 455/411 |
| 5,854,595 A | * 12/1998 | Williams | 340/825.44 |
| 5,969,330 A | * 10/1999 | Korsunsky et al. | 235/486 |
| 5,971,780 A | * 10/1999 | Youn | 439/160 |

FOREIGN PATENT DOCUMENTS

| | | |
|---|---|---|
| EP | 0 328 692 A1 | 8/1989 |
| EP | 0 349 210 A2 | 1/1990 |
| EP | 0 350 509 A1 | 1/1990 |
| GB | 1123640 | 8/1968 |
| GB | 2 251 505 A | 7/1992 |
| GB | 2 307 580 A | 5/1997 |
| GB | 2 323 953 A | 10/1998 |
| WO | WO 90/13952 | 11/1990 |

OTHER PUBLICATIONS

United Kingdom Search Report.

* cited by examiner

*Primary Examiner*—Brian Sircus
*Assistant Examiner*—Michael C. Zarroli
(74) *Attorney, Agent, or Firm*—Perman & Green, LLP

(57) ABSTRACT

A data card holder (20) is provided which comprises a housing defining an aperture (22) for receiving the data card (21), such as an RF card or SIM card, and a cover (27). The cover is movable with respect to the housing, between a closed position in which it prevents removal of the card from the housing, and an open position in which it allows removal of the card from the housing. Also provided is an ejector (28) which is coupled to the cover (27) so that it ejects the card from the housing when the cover is moved to its open position. Preferably the cover (27) and the ejector (28) form a unitary structure.

15 Claims, 7 Drawing Sheets

CARDHOLDER COVER AND EJECTOR

BACKGROUND OF THE INVENTION

The present invention relates to a holder for a card. In particular, it relates to an arrangement for retaining and releasing a data card.

Data cards take various forms and those used, for example, in cellular devices, may include passive memory cards (ie essentially a ROM), or an active processor card (ie capable of processing information internally within the card). An example of the latter is a smart card, which includes the memory implemented as an integrated circuit, commonly referred to as a "chip", in which information is stored. The smart card may comprise a subscriber identity module (SIM). Also, in addition to the subscriber identity information, such as a subscriber telephone number, and personal identification number (PIN), the smart card may store for example, call charge information (ie a charge meter), a telephone number index, or false pin entries.

SIM cards are currently available in two sizes. The functionality of the SIM is the same for each, it is essentially that the physical dimensions are different. One is a credit card size SIM, and the other is a plug in SIM about 15 mm by 20 mm.

Other active processor cards include expansion cards which typically provide a communication device with additional functions, such as a modem function, or provide a driver for an external device (for example video cards, printer cards).

One type of expansion card is a PCMCIA card (personal computer memory card international association). This card, and the device to which it is to be connected, are provided with connectors complying with the PCMCIA standard. The connector of the electronic (communication) device is a male connector (ie it has connector pins) and the card connector is a female connector (ie it has conductor barrels). When the PCMCIA card is connected with the PCMCIA connection of the electronic device, an electric coupling is formed between the connector pins and their corresponding conductor sockets. The PCMCIA standard defines the usual functions for each connector pin and corresponding conductor socket. Consequently, for example in an application where the PCMCIA connection is implemented in a personal computer, each data line in the data bus of the computer is connected to one connector pin in the PCMCIA. Further, at least some of the address and control lines are forward to the connector.

The main faces of the PCMCIA cards are of similar size to a credit card (85.6 mm by 54 mm), but the thickness may be 3.3 mm (type I), 5.0 mm (type II) or 10.5 mm (type III). Essentially, the PCMCIA cards are connected with an electronic device as an 8/16 bit I/O connection or memory. The card complying with the PCMCIA standard has a memory area which may be read by the electronic device and contains information for identifying the card (ie an information member data file—card information member, CIS).

Mobile station applications have been developed, particularly in connection with portable data processors (laptop PCs, hand held communication devices such as palm top PCs etc), in which at least the transmitter/receiver unit of the mobile station is arranged in PCMCIA standard card form. One such communication device is Nokia's cellular card phone. This comprises a micro-controller (MCU) for controlling the operation of the card. The microcontroller comprises, for example, a processor, a memory (RAM, ROM), and input output lines for connecting the microcontroller with the other electronics of the card. Further, an external memory, such as a SIM, can be connected to the micro-controller via an integral SIM card reader in the transceiver unit. The card is an autonomous cellular transceiver and comprises all the components which would be found in the transceiver of a conventional radio telephone.

Traditional data card holders include compartments having their full face open to the user, and slots into which the card is inserted longitudinally.

Compartments with their full face open to the user provide easy access to the card when it needs to be removed, and avoid the need to a complicated ejector. However, with the card removed, the open face of the card reader exposes components of the electronic apparatus to outside elements, such as dust and moisture. Further it restricts the component layout possibilities of the electronic device of which the holder forms a part, as a space the size of the user's finger must always be accessible to the user.

Generally, in slot type card holders a portion of the card is made accessible to the user so that he can grip the card to remove it from the slot. However, again miniaturisation of the device is restricted. WO/13952 shows a radio with one such design. This radio has a card slot in its radio portion. The slot is closed by a battery portion of the radio, which also has a groove for receiving the part of the card which protrudes from the slot for the user to grip. Removal of the card is a two stage action. Firstly, the battery portion is removed from the radio portion, and secondly the user grips the protruding part of the card and pulls it out of the slot.

Another slot type data card holder has a partial open face at one end enough for the users finger to be inserted to pull the card out. An example of this can be seen in U.S. Pat. No. 4,752,234.

Other designs of card holder avoid the need for accessibility of the card by the user when in its holder, by providing an ejector mechanism. For example, the apparatus in GB 22 51 505 is provided with a chip card reader ejector knob which the user slides to eject the card from the chip card reader. This card slot is protected from external elements by the battery pack, and access to the card is provided by a multistage action. Furthermore, the ejector mechanism increases the depth of the holder.

SUMMARY OF THE INVENTION

According to the present invention there is provided a data card holder comprising a housing defining an aperture for receiving a card; and a cover movable with respect to the housing between a closed position in which it prevents removal of the card from the housing, and an open position in which it allows removal of the card from the housing wherein the holder further comprises an ejector coupled to the cover for ejecting the card from the housing when the cover is moved to the open position.

Such a data card holder has a compact design. Further, the coupling of the ejector and cover simplifies removal of the card from the aperture, as the card is accessible by the single action of opening the cover. These advantages are further enhanced when the ejector and cover are directly connected.

Preferably, the ejector comprises a stop for limiting the longitudinal movement of the card when the cover is in the closed position. Such a stop enables the card to be positively located. Also, along with the cover, this stop maintains the card in the correct position, and provides shock absorption if the holder is knocked or dropped.

Desirably, the holder comprises a component which is multifunctional. For example, the stop may also provide the functions of ejecting the card and/or shock absorption and/or a link with the cover. This reduces the number of components required in the holder and consequently makes the holder easier to assemble, smaller, cheaper and more durable.

Preferably, the cover is pivotally linked to the housing, as this can reduce the size of the holder further. This is especially true when the pivot point is near the ejector.

Further reduction in the number of parts required is provided if the cover is resiliently biased towards the closed position, as this avoids the need for catches etc to maintain the cover in the closed position.

According to another aspect of the present invention there is provided an interface for a communication device comprising a holder of the present invention and a connector for the transfer of data between the card and the communication device. Preferably the connector is fixed to the housing to improve durability.

According to a further aspect of the present invention there is provided a communication device comprising such an interface.

In one embodiment of the invention, the communication device comprises a user interface, and is arranged to receive an RF card and transfer data between the RF card and the user interface. This device can be used, for example, in different radio systems by changing the RF card.

Preferably, the cover forms part of the cover of the interface or communication device, as this improves compactness further.

BRIEF DESCRIPTION OF THE DRAWINGS

Embodiments of the present invention will now be described, by way of example, with reference to the accompanying drawings, of which.

DETAILED DESCRIPTION OF THE INVENTION

Figure 1A:
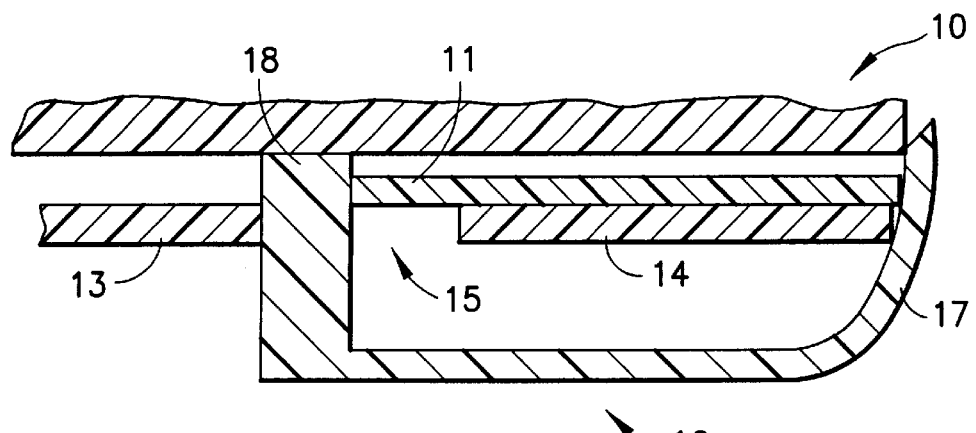
FIG. 1 shows removal of a card from a card holder according to the first embodiment of the present invention.

FIG. 1 shows a card holder 10 according to an embodiment of the present invention and a card 11. The card holder comprises a housing with a card slot 12. Walls 13 and 14 of the slot 12 are separated by a gap 15, and wall 14 acts as a card support surface along which the card 11 is slid when being inserted or removed from the slot 12. The holder also comprises a unitary member 16, one portion of which provides a cover 17 for card slot 11, and another portion of which 18 provides card ejection. The ejector portion 18 extends into the gap 15 between the walls 13, 14. In this embodiment, the width of the ejector 18 is narrower than the gap 15 by an amount equivalent to that required to protrude from the slot 12 when the card 11 is to be removed.

Insertion of the card into the holder is possible when the cover 17 is in its open position, ie when it uncovers the slot 12 sufficiently for the end of the card 11 to be inserted in the slot 12. The card 11 is slid into the holder 10, and the cover 17 moved into its closed position, ie the position at which it closes the slot 12. As mentioned above, in this embodiment, the cover 17 forms part of the unitary member 16 of which the ejector 18 also forms a part, so that movement of the cover 17 results in the corresponding movement of the ejector 18. Thus, when the cover is closed, ejector 18 is inserted into the front end of the gap 15 as shown in FIG. 1a, and acts as a stop preventing the card from travelling further forward into the holder 10. The unitary member is dimensioned so that the card 11 fits snugly between the ejector 18 and the cover 17. Consequently, abrupt movement of the holder is dampened and damage to the face of the card etc is prevented.

Figure 1B:
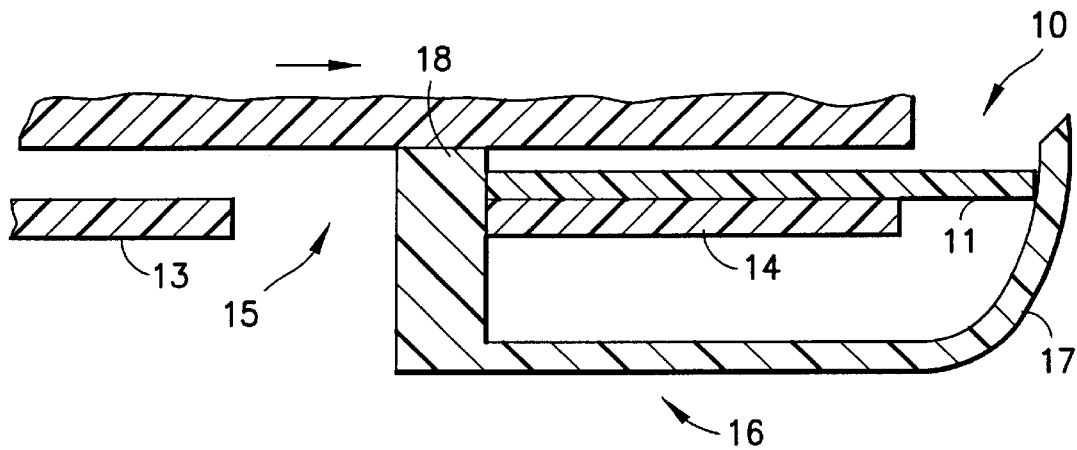
Figure 1C:
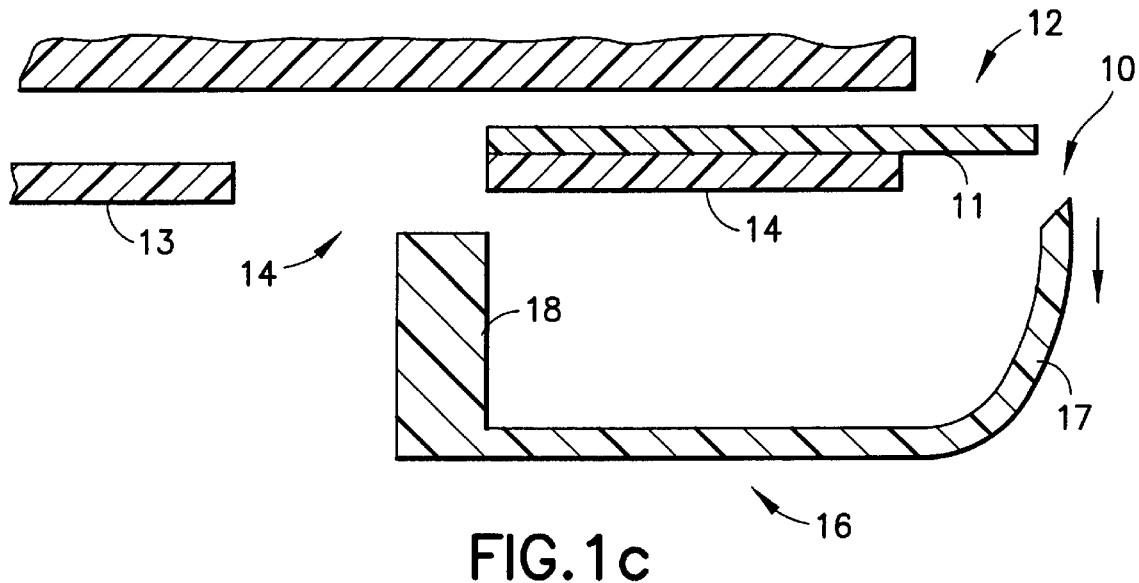

Removal of the card is achieved by sliding the cover 17 in the longitudinal direction indicated by the arrow in FIG. 1b, until ejector 18 abuts the rear end of gap 15, and then moving the cover 17 in the direction shown by the arrow in FIG. 1c until it reaches its open position. The longitudinal sliding action causes the ejector 18 to abut the end of the card 11 and forward the card out of the end of the slot 12 sufficiently for the user to grip it for complete removal from the holder 10.

A person skilled in the art will realise that a number of different mechanical arrangements can be used to releasably connect the unitary member 16 from the main housing of the holder 10 and to enable the unitary member 16 to be slid with respect to this main housing. For example appropriately shaped grooves may be provided on the housing and corresponding projections may be provided on the unitary member 16.

Figure 2:
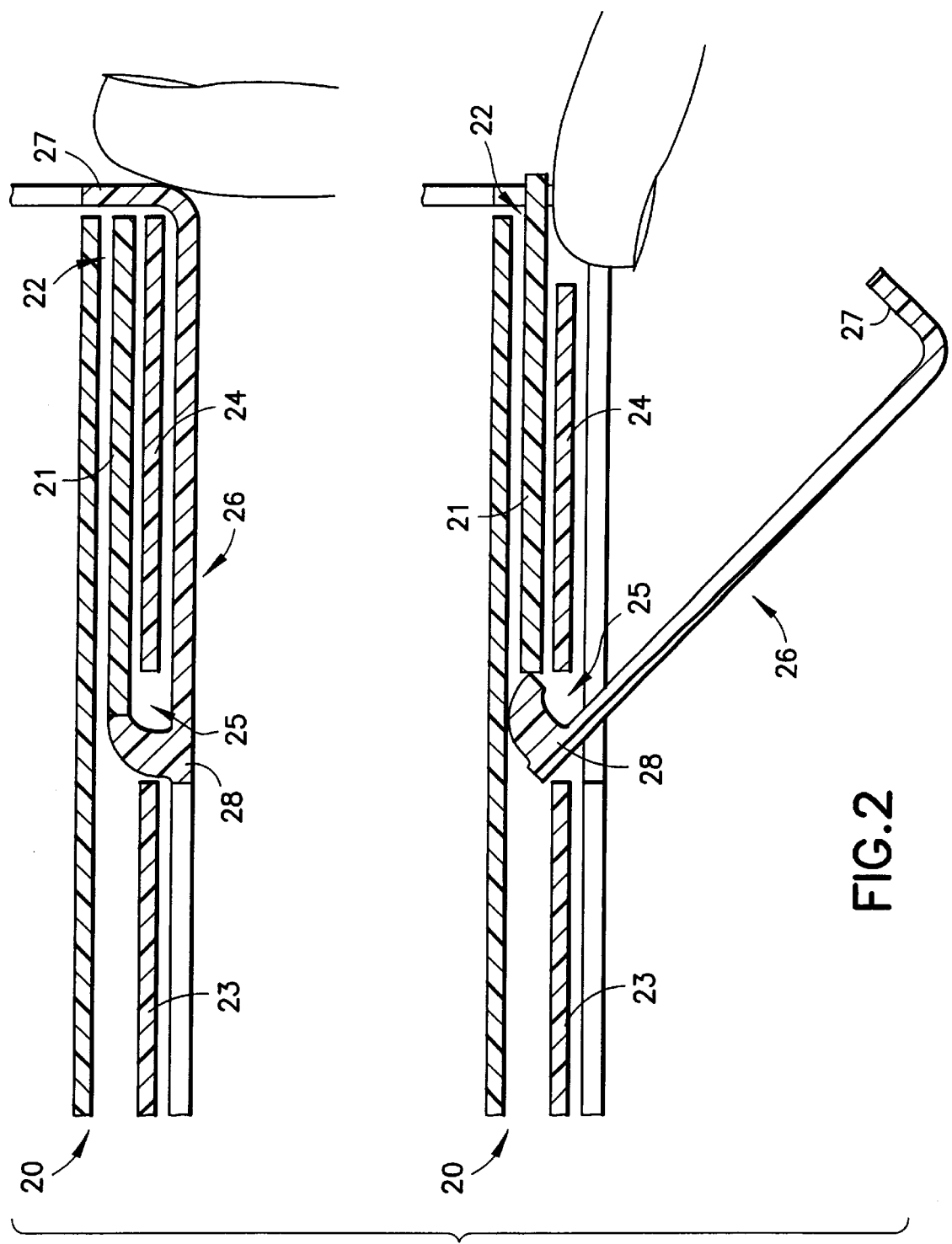
FIG. 2 shows removal of a card from a card holder according to a second embodiment of the present invention.

FIG. 2 illustrates an alternative data card holder to that shown in FIG. 1. The main housing of the holder is similar to that shown in FIG. 1, but the holder of this embodiment has a preferred unitary member which is pivotally connected to the main housing.

In FIG. 2, the card holder 20 comprises a card slot 22 for receiving a data card 21. Again the housing comprises walls 23 and 24, which are separated by a gap 25, and the wall 24 acts as a card support surface, along which the card is slid when being inserted or removed from the slot. A unitary member 26 again has one portion which provides a cover 27 for the slot 22 and a portion 28 for providing card ejection. Likewise, this card ejector 28 extends into the gap 25 between the walls 23 and 24. In this embodiment, the unitary member 26 is pivotally mounted about the ejector 28. Consequently, the width of the gap can be smaller than that required in the embodiment shown in FIG. 1.

Insertion of the card in the holder 20 is possible when the cover 27 is in its open position, ie when the unitary member 26 has been rotated about the pivotal point so that the cover 27 clears the slot 22 sufficiently for the card 21 to be inserted. The card is slid along wall 24 into the holder. In this embodiment, the pivotal point of the member 26 is positioned such that the card abuts the end of the ejector 28 when it is only partially inserted and the continued insertion of the card into the holder causes the unitary member 26 to rotate anti-clockwise about the pivot point. The unitary member 26 continues to be rotated until it reaches its closed position, ie when it closes the slot 22.

The pivotal link may be provided in a number of ways, an example of which is shown in FIG. 4 and discussed below. Further, maintaining the cover in the closed position may be effected using a latch or other similar mechanism. However, preferably, the unitary member 26 is resiliently biased towards the closed position as this further simplifies the member of the holder. Removal of the card is achieved by rotating the cover 27 clockwise which, in turn, causes the ejector 18 to push the card out of the slot 22. The cover 27 is rotated until the card protrudes out of the end of the slot sufficiently for the user to grip it for complete removal.

Figure 3:
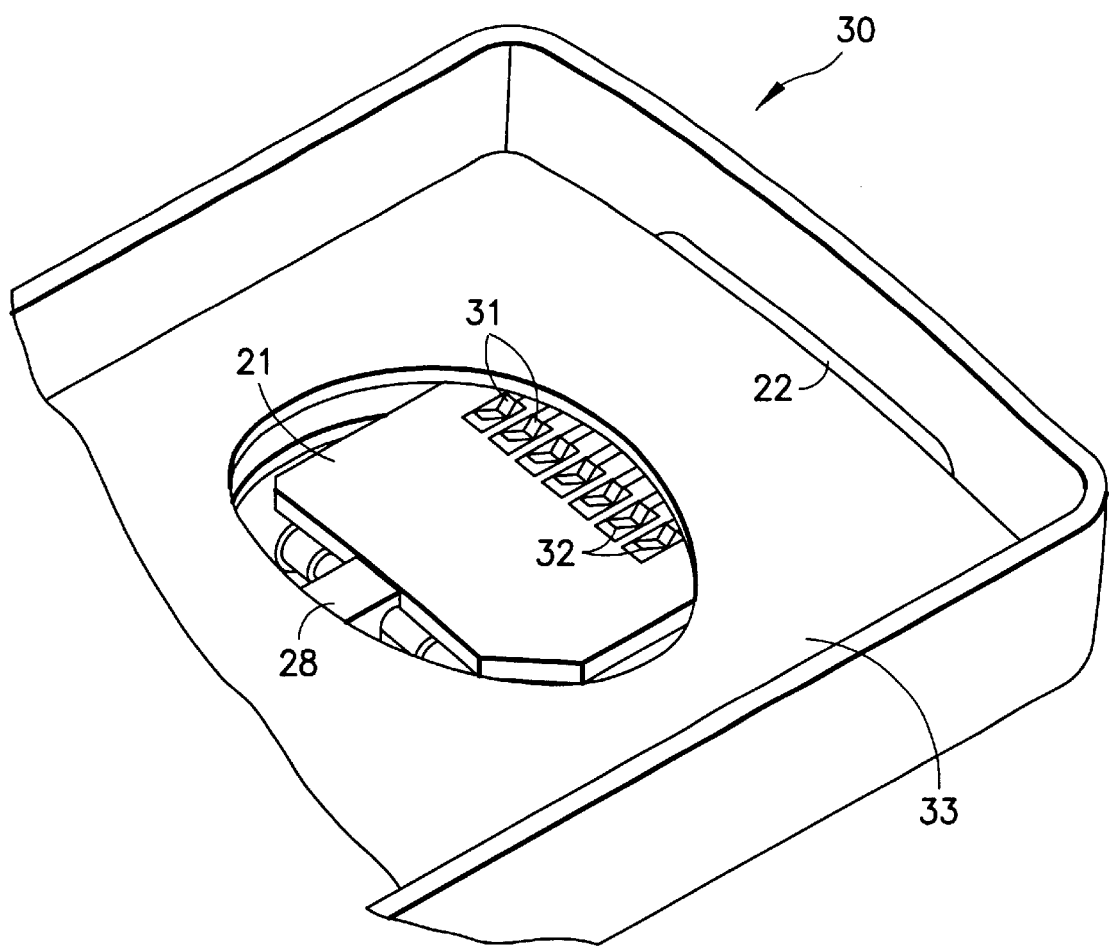
FIG. 3 shows a SIM card in a SIM card reader according to an embodiment of the present invention.

FIG. 3 shows the perspective view of a SIM card reader 30 for a small size (plug in) SIM card 21. This SIM card reader comprises a card holder 20 with a longitudinal section like that shown in FIG. 2. The top face of the card slot comprises a PCB 33 bearing electronics to carry out the card reading. It also comprises a SIM connector, preferably comprising flexible connector lugs 31 which are connected to the card reading circuitry, and make electrical contact with contact on the respective surface of the SIM card when the card is positioned in the holder 20.

Figure 4A:
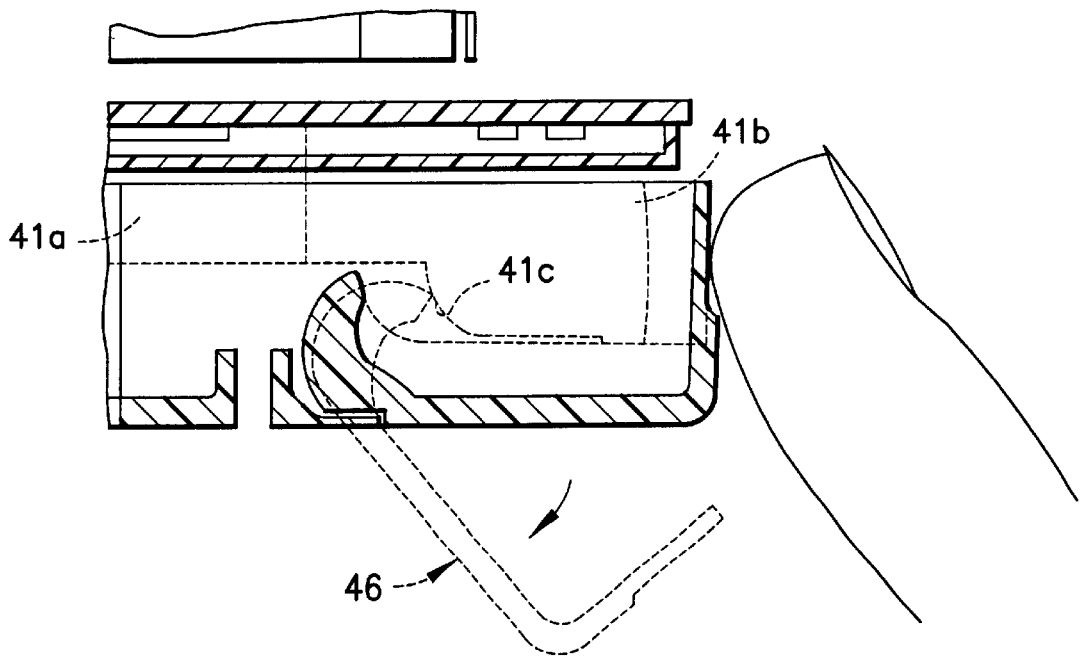
FIG. 4a is a longitudinal section of an RF card holder showing ejection of the card.

Clearly, this card reader could be modified for other memory cards such as MMC cards, for example. It is particularly suited to those cards with contacts on their full face. In contrast, FIG. 4a is a longitudinal section of a card holder which is suited to cards with end contacts. In this embodiment, the holder is an RF card holder. The RF card 41 has a first portion 41a at the end of which PCMCIA connectors are situated, and a second portion 41b, which is thicker than the first, and may for example hold large SMD components, an integral antenna, and a connector to an external antenna. (Another example of an RF card is described with reference to FIGS. 5a and 5b). The card holder slot is shaped to received this RF card, connector end first. As can be seen in FIG. 4a, the unitary member 46 is pivotally connected to the main housing such that when the card is inserted the front edge 41c of the wide portion 41b of the RF card 41 abuts the ejector portion 48 of the unitary member and when the cover 47 is moved to its open position, the ejector rotates clockwise, applying increasing pressure to the wide portion of the RF card 41 so that a sufficient portion of the card is pushed out of the holder for the user to grip and totally remove the card from the holder.

Figure 4B:
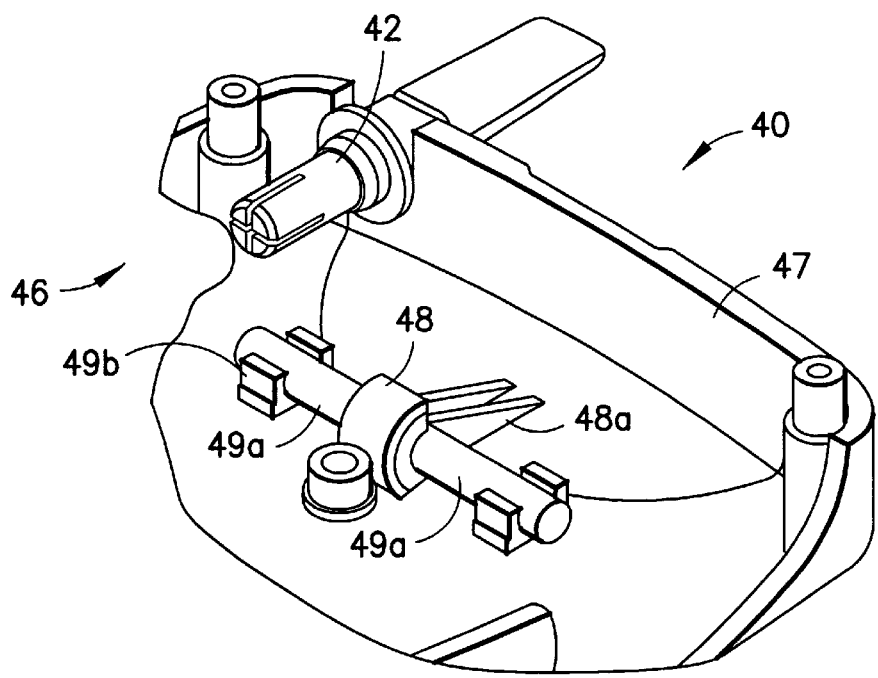
FIG. 4b shows an RF card holder arrangement according to an embodiment of the present invention.

FIG. 4b shows a perspective view of an RF card holder 40 comprising a main housing and a unitary member 46. The unitary member 46 comprises a cover 47, claw shaped ejector 48 and shaft 49a, whilst the housing has a corresponding shaft holder 49b. The shaft 49a and shaft holder 49b together provide a pivotal linkage between the unitary member and the housing, the shaft 49a extending from the ejector 48. A ramp 48a couples the ejector and cover and serves to push the card upwards in the slot for a tight fit, and also strengthens the ejector. The distance between the card abutment face of the ejector 48 and the opposing face of the cover 47 is chosen close to the length of the wider portion 41b of the RF card so that the card fits snugly between. Consequently, the ejector 48 also functions as a shock absorber.

The RF card holder of the embodiment also comprises an external antenna 42. This can be arranged so that when the RF card is located in the RF card slot, the end of the antenna is in electrical contact with the external antenna connector of the RF card.

Figure 5A:
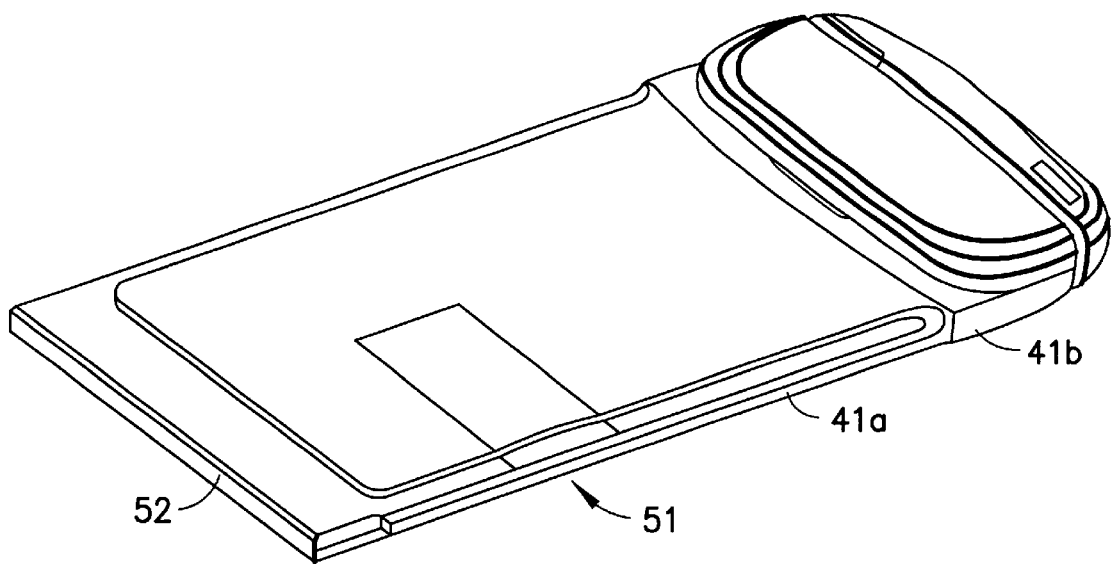
FIGS. 5a and 5b illustrate the implementation of a card holder for a SIM card in an RF card.

FIG. 5a shows an RF card comprising a SIM card reader 51. This SIM card reader may be similar to that shown in FIG. 3, for example. Further, this RF card itself may be inserted into an RF card holder such as that shown in FIG. 4 with its connector end 52 inserted first.

Figure 5B:
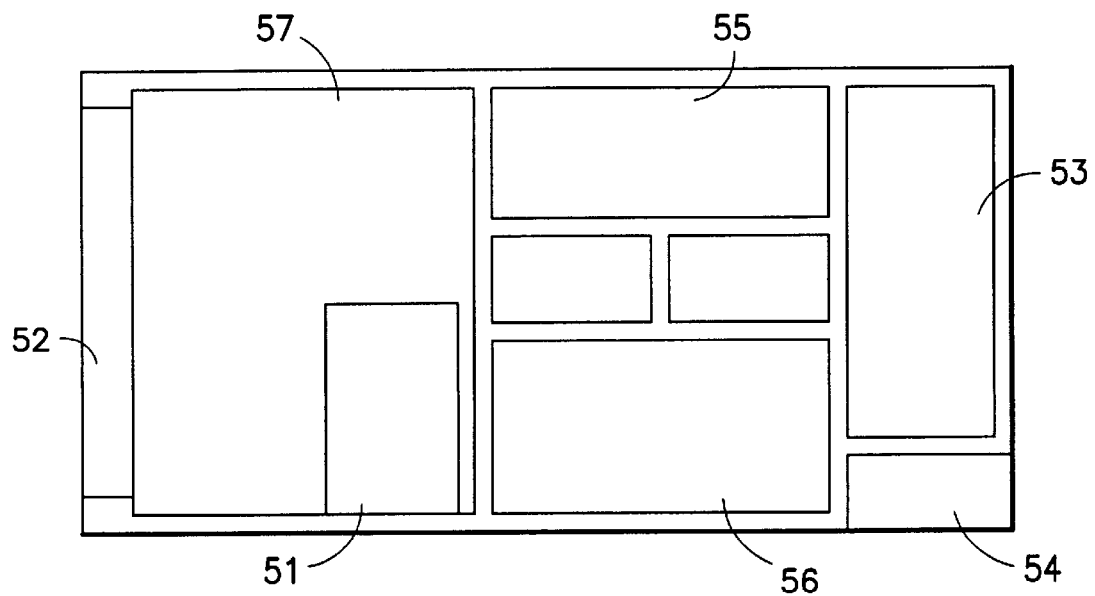

FIG. 5b shows the RF card of FIG. 5a in more detail. It comprises 5 parts: a front cover made up of a front metal plate (part of the narrower portion 41a), a plastic end module including an antenna insert (thicker part 41b), a PCB module and a unitary member 46 comprising an ejector 48 and cover 47, and a rear cover made up of a rear metal plate.

The assembly of this card is simple as the 5 components merely click together, and the assembly is along the z axis only. Firstly, the PCB is installed into the plastic end part and then this combination is installed into the front metal plate, to complete the front cover. Finally, this front cover is connected to the rear cover.

The PCB layout of this card is as follows. SMD capacitors are positioned in the thicker region 41b of the card. An antenna insert 54 also resides in this thicker region 41b, and its RF connection is effected by a metal spring on the PCB. A ground connection is also provided for an optional external antenna by means of another similar spring.

The card comprises an RF subsystem 55, baseband subsystem 57, and RF shielding in the form of conductive foam walls 56. These walls are moulded directly to the inner surfaces of the front and rear metal covers. Ideally local RF shielding to the different RF subsections is achieved using the same shielding technique. Alternatively open topped metal shields may be provided which are connected to the front and rear metal covers using spring-like metal joints. Both of these alternatives enable the provision of a thin RF card.

As mentioned above, the SIM card reader 51 may be similar to that shown in FIG. 3.

Figure 6:
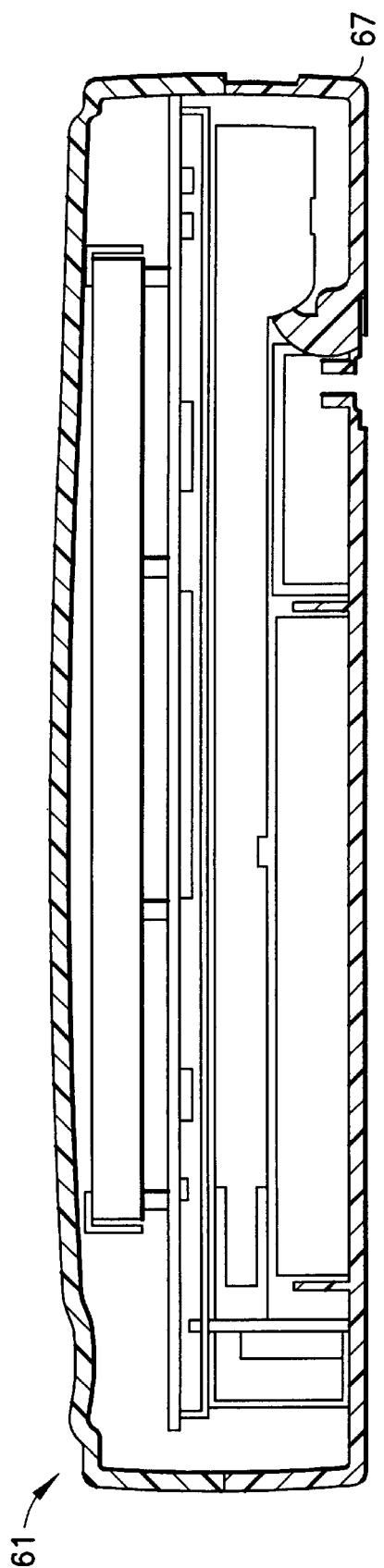
FIG. 6 is a longitudinal section of a radio telephone comprising the RF card of FIG. 4.

FIG. 6 illustrates a communication device 61 comprising an RF card holder as described with reference to FIG. 4. In this embodiment, the cover 67 forms part of the outer housing of the communication device. This communication device may, for example, be a radio telephone, a lap top PC, a hand held device such as a palm top PC, WLAN mobile or fixed part etc.

Figure 7:
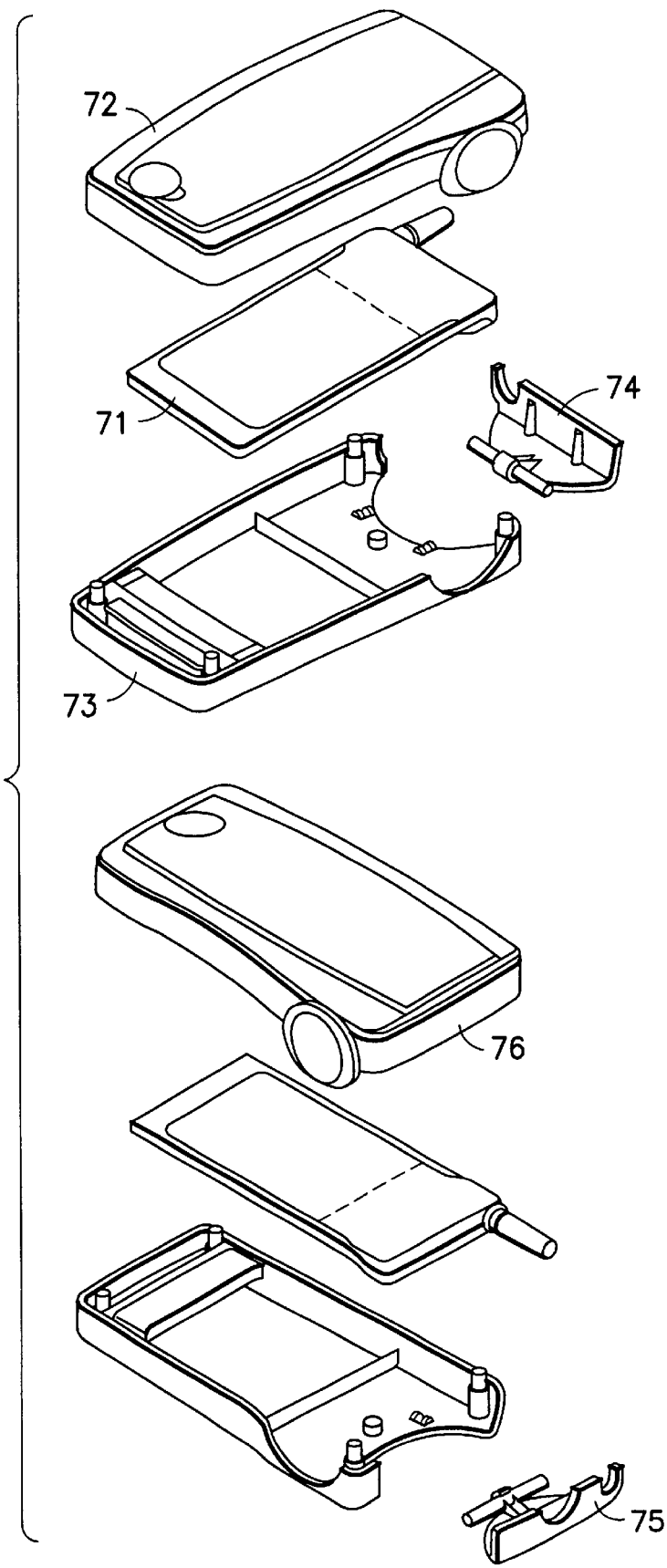
FIG. 7 shows front and rear perspective views of a radio telephone housing comprising the RF card holder of FIG. 4 and an RF card.

FIG. 7 shows perspective views of a mobile phone incorporating an RF card 71 in more detail. As can be seen, the housing of the communication device comprises three parts, a front cover 72, and a rear part comprising a main rear portion 73, and a unitary member 74 comprising the RF card slot cover, card ejector and a shaft. The shaft, together with corresponding shaft supports on the rear housing 73, provides a pivotal link between these rear parts.

In this embodiment the cover 74 has a recessed portion with a surface 75 which is in contact with the inside surface 76 of the phone's front cover 72 when the cover 74 is in its closed position. To release the cover from its closed position, the cover 74 is pushed inwards, so that the surface 75 no longer contacts the inside surface 76 of the front cover 72, and then rotated clockwise. This design is advantageous as it provides an improved release of the card from the holder for the following reason. The pushing inwards of the cover 74 causes the card to push against the ejector which in turn pivots anticlockwise. This causes an increased exertion of the clockwise rotational force acting on the ejector when the cover 74 is moved into its open position.

As FIG. 7 illustrates, the present invention reduces the number of components required in a card holder, and thus simplifies the design of an electronic device comprising such a holder. In this embodiment, manufacturing is also simplified not only because of the reduced number of components, but also because they are all assembled along the z axis. For example the shaft may be a simple push fit into the shaft holder of the main rear body portion 73.

The present invention includes any novel feature or combination of features disclosed herein either explicitly or any generalisation thereof irrespective of whether or not it relates to the claimed invention or mitigates any or all of the problems addressed.

In view of the foregoing description it would be evident to a person skilled in the art that various modifications may be made within the scope of the invention.

What is claimed is:

1. A data card holder comprising:

a housing defining an aperture for receiving a card; and a cover for covering the aperture, the cover being movable between a closed position in which it prevents removal of the card from the housing, and an open position in which it allows removal of the card from the housing; wherein:

the holder further comprises a unitary member including an ejecting portion and a cover portion, the member adapted to eject the card from the housing when the cover portion is moved to the open position.

2. A holder as claimed in claim 1, wherein the cover is pivotally linked to the housing.

3. A holder as claimed in claim 2, wherein the cover is pivotally linked to the housing by the ejector.

4. A holder as claimed in claim 3, wherein the pivotal link is provided by a shaft and a shaft support.

5. A holder as claimed in claim 6, wherein the shaft extends laterally from a stop.

6. A holder as claimed in claim 1 arranged such that the cover is movable between open and closed positions as a result of a single action.

7. An interface for a communication device comprising a holder as claimed in claim 1 and a connector for the transfer of data between the card and the device.

8. A communication device comprising a holder as claimed in claim 1.

9. A data card holder comprising:

a housing defining an aperture for receiving a card; and a cover movable between a closed position in which it prevents removal of the card from the housing, and an open position in which it allows removal of the card from the housing; wherein:

the holder further comprises a unitary member including an ejector coupled to the cover for ejecting the card from the housing when the cover is moved to the open position and wherein the ejector comprises a stop for limiting longitudinal movement of the card when the cover is in the closed position.

10. A holder as claimed in claim 9, arranged such that the stop is urged into contact with an edge of the card as the cover is moved to the open position, so as to eject the card from the housing.

11. A data card holder comprising:

a housing defining an aperture for receiving a card; and a cover movable between a closed position in which it prevents removal of the card from the housing, and an open position in which it allows removal of the card from the housing; wherein;

the holder further comprises a unitary member including an ejector coupled to the cover for ejecting the card from the housing when the cover is moved to the open position and wherein the cover is resiliently biased towards the closed position.

12. An interface for a communication device comprising:

a data card holder including a housing defining an aperture for receiving a card; and a cover movable between a closed position in which it prevents removal of the card from the housing, and an open position in which is allows removal of the card from the housing, and wherein the holder further includes a unitary member comprising an ejector coupled to the cover for ejecting the card from the housing when the cover is moved to the open position; and a connector for the transfer of data between the card and the device, said connector comprising a PCMCIA connector.

13. An interface for a communication device comprising:

a data card holder including a housing defining an aperture for receiving a card, and a cover movable between a closed position in which it prevents removal of the card from the housing, and an open position in which it allows removal of the card from the housing; and wherein the holder further includes a unitary member comprising an ejector coupled to the cover for ejecting the card from the housing when the cover is moved to the open position; and a connector for the transfer of data between the card and the device, said connector comprising a memory card connector.

14. A communication device with an interface comprising:

a data card holder including a housing defining an aperture for receiving a card; and a cover movable between a closed position in which is prevents removal of the card from the housing, and an open position in which it allows removal of the card from the housing, and an open position in which it allows removal of the card from the housing; and wherein the holder further comprises a unitary member including an ejector coupled to the cover for ejecting the card from the housing when the cover is moved to the open position; and a connector for the transfer of data between the card and the device.

15. A communication device as claimed in claim 14, comprising a user interface and arranged to receive an RF card and transfer data between the RF card and the user interface.

\* \* \* \* \*